O. R. SELL.
VEHICLE HEAD LAMP CONTROL.
APPLICATION FILED OCT. 11, 1916.
1,278,033.
Patented Sept. 3, 1918.
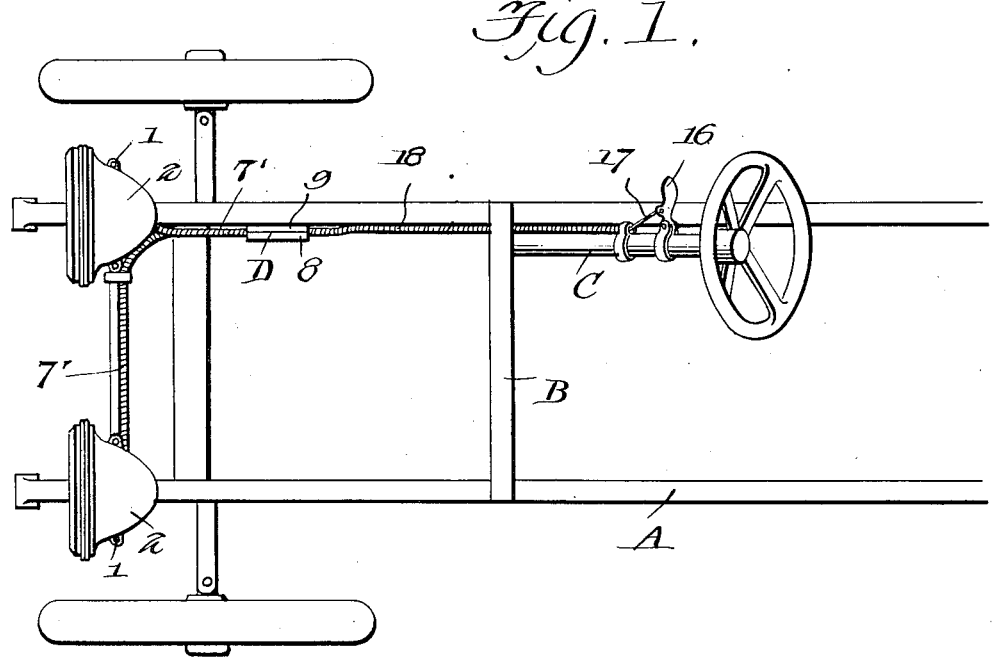
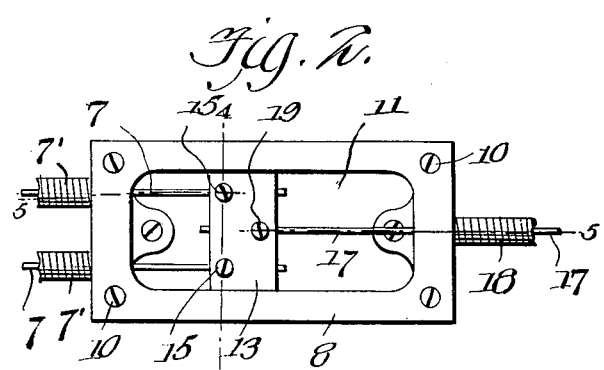
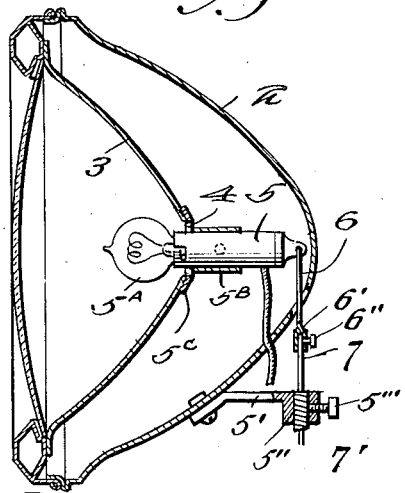
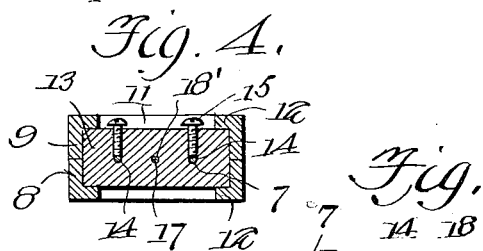
Witnesses
Hugh H. Ott
Edwin D. Jones
Inventor
Otto R. Sell,
By Victor J. Evans
Attorney

UNITED STATES PATENT OFFICE.

OTTO R. SELL, OF COLORADO SPRINGS, COLORADO.

VEHICLE-HEAD-LAMP CONTROL.

1,278,033.	Specification of Letters Patent.	Patented Sept. 3, 1918.

Application filed October 11, 1916. Serial No. 125,048.

*To all whom it may concern:*

Be it known that I, OTTO R. SELL, a citizen of the United States, residing at Colorado Springs, in the county of El Paso and State of Colorado, have invented new and useful Improvements in Vehicle-Head-Lamp Controls, of which the following is a specification.

This invention relates to vehicle head-lamp controls which is particularly adapted for manipulating or controlling the tiltable lamps disclosed in my application for patent filed May 26, 1916, Serial No. 100,072, now Patent 1,247,582. In the above referred to application the lighting medium which is in the form of an electric lamp is mounted to tilt in the lamp casing with relation to the reflector in order to throw the rays of light in a direction which will not blind or confuse pedestrians or drivers of other vehicles.

My improvement contemplates an adjustable means for actuating the tiltable lamps, said means being purposely designed to permit the operator of the vehicle upon which the lamps are installed to simultaneously move each of the lamps within the lamp casings an equal distance by means of a lever arranged in convenient position upon the dash or steering post of the vehicle.

In carrying out my invention I adjustably and detachably connect each of the lamps within the lamp casings with flexible members such as strands of wire, or the like, while connected with the controlling lever is another flexible element, the free ends of the lamp wires and the flexible element connected with the lever being connected by means of a movable block whereby upon movement of the lever and flexible element connected therewith the block will be actuated to simultaneously move the lamp wires whereby the lamps in the lamp casings may be tilted with relation to the reflectors therein to change the projection of the light rays.

Another object of the invention is to provide novel means for supporting the movable block upon the frame of the vehicle upon which the lamp control is installed, the said means being adapted to guide and limit the sliding movement of the block when actuated by the controlling lever for moving the lamps.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications, within the scope of the claims may be resorted to when desired.

In the drawing:

Figure 1 is a top plan view of a portion of a frame of a motor vehicle and showing the invention applied thereto.

Fig. 2 is a detail view of the movable block and support therefor which enables the same to be connected with the frame of the machine.

Fig. 3 is an enlarged sectional view of one of the lamp casings to more clearly illustrate the manner of adjustably and detachably connecting lamps with the wires on the sliding block.

Fig. 4 is a transverse section on the line 4—4 of Fig. 2.

Fig. 5 is a longitudinal section on the line 5—5 of Fig. 2.

Like characters of reference denote corresponding parts throughout the several views in the drawing.

Referring now to the drawing in detail, the improved lamp control has been shown applied to a motor vehicle, the frame of which is indicated at A, the dash at B, and the steering post at C.

Formed in each reflector 3 at the apex thereof is an opening 4 which permits a lamp socket 5 to extend within the reflector as shown in Fig. 3 in the drawing. The lamp socket 5 has detachably connected therewith a lamp $5^A$ and is arranged within the bore of a lamp holder $5^B$. The lamp holder $5^B$ is mounted to turn on a bracket $5^C$ which is fixed to the reflector 3 and preferably provided with means for yieldably holding the lamp holder against turning movement.

Secured to each lamp casing and extending rearwardly therefrom is an arm 5' having formed therein an opening 5" into which extends the shank of a binding screw 5'''.

Pivotally connected with the rear end of each lamp socket 5 is a link 6, a portion of which extends below the lamp casing 2 in which the lamp is arranged through an opening therein and is enlarged for a portion of its length to provide a socket 6' in which is retained by means of a binding screw 6″ in the socket the terminal of a flexible member 7 which in this instance has been shown as a wire arranged in a flexible tubing 7′ and extending beyond the ends thereof with one end of the tubing received and retained in the opening 5″ in the arm on the bracket by the binding screw 6‴, said flexible tubings 7′ being trained over the frame A of the vehicle in any suitable manner and have their other terminals extending into one end of a casing generally indicated at D and rigidly secured to one side of the frame A preferably the side adjacent which the steering post C is located.

The casing D comprises in this instance two sections 8 and 9 which are held in contact with each other by means of screws 10 passing through said sections and removably connecting the same together. Formed in the side walls of each section is an elongated opening 11 which through the arrangement of the sections aline with each other and afford access to a block 13 mounted for sliding movement within the casing D.

The block 13 is provided with spaced and transversely extending openings 14 which are adapted to receive the free ends of the flexible members 7 which extend within the casing D through the ends of the flexible tubings 7′ received in openings formed by recesses in one end wall of the sections 8 and 9, the block 13 being further provided with binding screws 15 which are adapted to engage and lock the terminals of the flexible members within the openings 14 in the block 13.

Pivotally mounted upon the steering post C is a lever 16 to which is connected one end of a block actuating wire 17, the wire being passed through a flexible tubing 18 passing through the dash B and having one end thereof arranged in an opening formed by recesses in the other end wall of the sections 8 and 9 of the casing D with the end of the actuacting wire 17 which extends beyond the secured end of the tubing 18 received in an opening 18′ in the block 13 in which it is retained by a binding screw 19. Through the above described manner of connecting the actuating wire 17 with the block 13, it will be seen that when the lever 16 is turned on the steering post the block 13 will be moved longitudinally of the casing D thus causing the flexible members 7 to tilt the lamps 5 within the lamp casings 2. The terminals of the flexible tubing 7′ and 18 which extends within the casing are firmly gripped by the casing sections 8 and 9 and thus prevented from being accidentally disconnected from the casing D.

When the device is in use and it is desired to change the direction of the light rays to prevent the same from blinding a pedestrian or the driver of another vehicle, the lever 16 is turned upon the steering post C in a direction to cause the block actuating wire 17 to slide the block 13 in the casing D toward the steering post C, such sliding movement of the block 13 causing the lamp actuating wires 7 to tilt the lamps within the lamp casings 2 with relation to the reflectors 3 therein so that the angle of projection of the light rays through the lenses in the lamp casings is correspondingly changed.

When the lever 16 is moved in the opposite direction the lamps will move to their normal position within the lamp casings 2 by the wires 7 and 17, it being understood that the lamps within the reflector can be set at any point between normal and extreme up position by adjusting the wire 7 in the block 13, so as to direct the rays of light at different distances ahead of vehicle, as road conditions may demand.

Through the above dsecribed manner of constructing the improved lamp control, it will be seen that the block actuating wire 17 is adjustably mounted within the block 13 and that the lamp actuating wires 7 are not only adjustably mounted within the block 13, but also detachably connected with the links 6, while the casing D is so constructed that access may be had to the block 13.

From the foregoing description, taken in connection with the accompanying drawing, it is at once apparent that a vehicle headlamp control has been provided which is simple in construction, inexpensive of manufacture, although highly efficient in use.

Having thus described the invention, what is claimed as new, is:

1. In a device of the class described, a fixed casing, a block mounted to slide therein, a lever, a flexible member connected with said lever adjustably connected with said block, lamps mounted for turning movement, a link swingingly connected with each of said lamps, and a flexible element detachably connected with each of said links adjustably connected with said block.

2. In a device of the class described, lamps mounted for turning movement, a link swingingly connected with each of said lamps, a wire detachably connected with each of said links, a lever, a wire connected with said lever, a block having openings therein into which the wires connected with the links and lever extend, a pair of connected casing sections between which said block is mounted to slide, and flexible casings through which the said wires are passed extending between and gripped by said casing sections.

In testimony whereof I affix my signature.

OTTO R. SELL.